United States Patent [19]
Tao

[11] 3,754,706
[45] Aug. 28, 1973

[54] TEMPERATURE RESPONSIVE BYPASS VALVE

[75] Inventor: Ting C. Tao, Bedford Heights, Ohio

[73] Assignee: Rockwell International Corporation, Pittsburgh, Pa.

[22] Filed: Nov. 15, 1971

[21] Appl. No.: 198,735

[52] U.S. Cl. ................ 236/92 R, 137/491, 165/38, 236/99
[51] Int. Cl. ......................................... G05d 27/00
[58] Field of Search .................... 165/38; 236/92 R; 137/110, 491

[56] References Cited
UNITED STATES PATENTS

| | | | |
|---|---|---|---|
| 3,404,837 | 10/1968 | James | 236/34.5 |
| 3,556,128 | 1/1971 | Scaglione | 137/491 |
| 3,493,008 | 2/1970 | Scaglione | 137/491 |

*Primary Examiner*—William E. Wayner
*Assistant Examiner*—William E. Tapolcai, Jr.
*Attorney*—John R. Bronaugh et al.

[57] ABSTRACT

A normally pressure balanced thermally responsive bypass valve is provided in which the pressure balance is disabled above a predetermined fluid pressure.

3 Claims, 2 Drawing Figures

3,754,706

TEMPERATURE RESPONSIVE BYPASS VALVE

BACKGROUND OF THE INVENTION

This invention relates to fluid circuits such as lubricating systems for transmissions in vehicles or airplanes incorporating a heat exchanger, and more specifically to improved thermal bypass valves for such systems.

In lubricating systems for high speed transmissions especially as used in aircraft, it is known to incorporate a heat exchanger in the system to prevent the lubricating oil from being overheated and thus cause malfunction in the transmission system. At the same time, it is desirable to keep the lubricating oil at a certain minimum temperature for better lubricating characteristics. For this reason, it has been known to incorporate a heat responsive bypass valve in such systems to automatically direct the fluid to the heat exchanger when its temperature exceeds a predetermined level and to automatically bypass a heat exchanger so long as the fluid temperature is below that level. This permits a fast temperature rise for the lubricating oil, which is desirable for proper performance of the transmission system, but upon reaching the predetermined temperature level, a bypass is actuated and the oil is directed to the heat exchanger for cooling. When the temperature of the oil has dropped to a predetermined value, the valve again opens the bypass and thus allows oil again to bypass the heat exchanger. In this way, the temperature of the lubricating oil is always kept at or close to a predetermined level which is optimum for the particular application.

Valves such as this should be insensitive to fluid pressure variations so long as the pressure does not exceed safe limits but must act as pressure relief valves if the inlet pressure to the heat exchanger becomes excessive. For this reason, it is known to make the thermal bypass valve responsive to fluid pressure to open the bypass should a predetermined fluid pressure level be exceeded, such as for example in the manner disclosed by U.S. Pat. No. 3,404,837, issued to James on Oct. 8, 1968, entitled "Thermal Bypass Valve With Bimetallic Control" and assigned to the assignee of the present invention. James discloses a partially balanced pressure sensitive valve having opposed fluid pressure sensitive surfaces of unequal area, the larger being subjected to heat exchanger inlet pressure. Upon a predetermined fluid pressure being reached, a differential force caused by the fluid pressure on the differential area of the pressure sensitive surface overcomes the valve closing force of the bimetallic discs and opens the bypass. However, the James valve is inherently only partially pressure balanced and varying fluid flow rates and applied fluid pressures cause the differential force to vary accordingly. This renders the James thermal bypass valve sensitive to varying fluid flow rate. If the fluid flow rate varies on the high side from a predetermined value while the bypass is open this results in a higher differential force which causes then the thermal valve to delay in closing. A low fluid flow rate resulting in a lowered differential force causes the thermal valve to close prematurely under the influence of the bimetallic discs.

It is an object of the present invention to provide an improved thermally responsive bypass valve which is normally completely pressure balanced and therefore insensitive to varying fluid flow rates but which is adapted to open in response to excessive upstream fluid pressures.

SUMMARY OF THE INVENTION

The present invention provides an improved normally pressure balanced thermally responsive valve sub-assembly for use in automatically controlling fluid flow through a bypass passage. The sub-assembly includes a valve member mounted for movement toward and away from seating engagement with the downstream side of a valve seat forming the bypass passage. A resilient means biases the valve member away from the valve seat. Thermally responsive means are disposed in the fluid flow path at the downstream side of the valve seat and are connected to the valve member to overcome the biasing means and thereby move the valve member to engage the valve seat when the temperature of the fluid at the downstream side of the valve member seat exceeds a predetermined magnitude. Means responsive to the pressure of the fluid at the face of the valve member act to bias the valve member toward the seat in opposition to the fluid pressure acting directly on the face of the valve member. By providing balanced and oppositely directed fluid pressure responsive areas exposed to fluid pressure the movement of the valve member is made independent of changing fluid flow rates. Means are provided for reducing the fluid pressure applied to said fluid pressure responsive valve biasing means when the fluid pressure at the valve face exceeds a predetermined magnitude to thereby eliminate the pressure balance on the pressure responsive areas and produce a differential force acting on the valve member which force overcomes the thermally responsive means to unseat the valve member from sealing engagement with the valve seat thus permitting the valve member to open and relieve fluid pressure.

DESCRIPTION OF THE INVENTION

Figure 1:
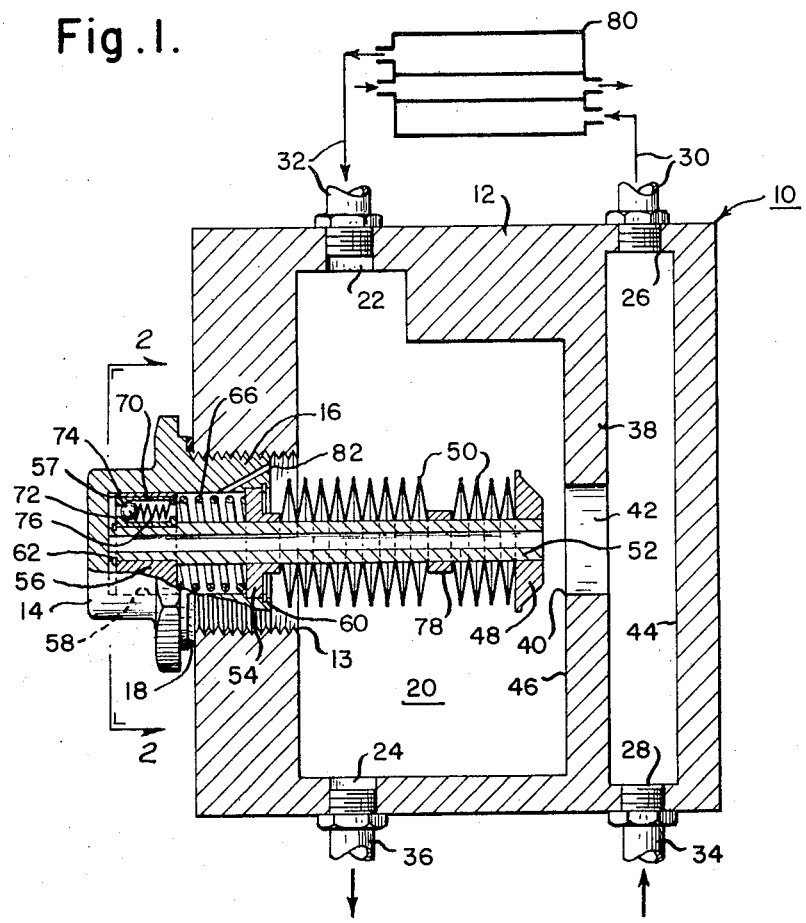
FIG. 1 is a partially sectional view with the valve being illustrated in an open position to bypass a heat exchanger circuit shown schematically.
Figure 2:
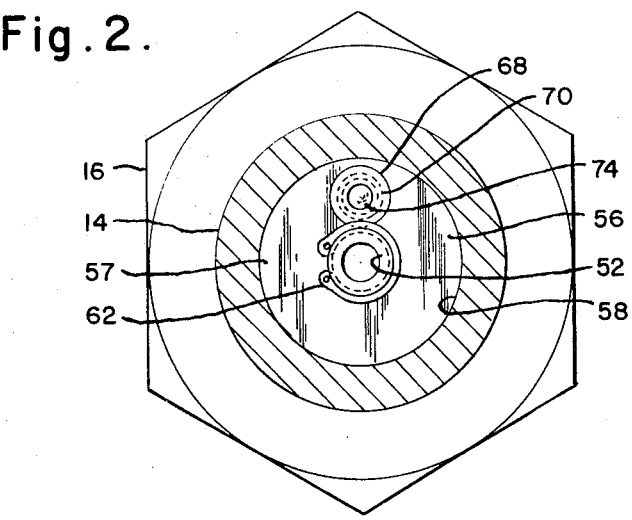
FIG. 2 is a sectional view taken along the line A—A of FIG. 1.

Referring to the figures, a valve 10 comprises a multi-chambered valve body 12 having a valve assembly mounting opening 13 closed by a threaded cap 14 which is integral with a valve actuating support 16, sealed to the body by a gasket 18. The valve body comprises a two part valve chamber 20 which has two pairs of oppositely disposed inlet and outlet apertures 22 and 24 and 28 and 26 respectively. Outlet 26 and inlet 22 are connected by the conduits 30 and 32 to the heat exchanger and inlet 28 and outlet 24 are connected by conduits 34 and 36 to a lubricating circuit (not shown). The valve chamber 20 is divided by an internal partition 38 having a central aperature 42 providing an actuator valve seat 40. When aperture 42 is open fluid flows therethrough between a rear part 44 of valve chamber 20 and a front part 46 thereof to provide direct communication between inlet 28 and outlet 24.

When aperture 42 is closed fluid flows from inlet 28 through chamber part 44, outlet 26, the heat exchanger, inlet 22, chamber part 46 and outlet 24. A valve head 48 is mounted on body 12 in alignment with aperature 42 and chamber part 46 and under conditions of high fluid temperature in chamber part 46 is resiliently held in sealing contact with seat 40 by a series of bimetallic discs 50. A hollow valve stem 52 is fitted to and extends co-axially through valve head 48, through valve chamber part 46 and a bushing 54 mounted in cap 14. Valve stem 52 axially extends through and has mounted at its end approximate cap 14 a piston 56 which has a piston end 57 that extends into and is axially slideably received in a piston chamber 58 internally formed in actuator support 16. Bushing 54 has a radially extending flange held in place between a shoulder of actuator support 16 and a retaining ring 60. Piston 56 is retained on one end of valve stem 52 by retaining ring 62 which holds the piston against a shoulder formed on one end of valve stem 52. The valve head 48 is fixed as by a press fit on the end of the valve stem 52 proximate seat 40. The cross sectional area of aperature 42 is substantially equal to the area of piston end 57 so that when equal fluid pressures are applied to the valve head 48 and the piston end 57 the valve stem 52 will be subjected to balanced fluid forces whether in the closed or open position. A coil spring 66 surrounding valve stem 52 is positioned between piston 56 and bushing 54 to normally bias piston 56 to the left as viewed in FIG. 1 so that valve head 48 is unseated and fluid communication exists between rear chamber part 44 and front chamber part 46 through aperature 42 thus bypassing the heat exchanger. This condition is maintained so long as the temperature in chamber part 46 remains below a predetermined level.

Piston 56 has a cylindrical eccentric throughbore 68 in which is mounted as by a press fit a check valve assembly 70. Check valve assembly 70 comprises a hollow cylindrical sleeve 72 having an aperature at one end normally closed by a ball 74 resiliently biased into position by a compression spring 76 mounted internally in sleeve 72. When the valve head 48 is closed piston end 57 and a portion of the surface of ball 74 are exposed to the same fluid pressure as is in rear chamber part 44 of chamber 20.

A series of alternating oppositely facing frusto-conical bimetallic discs 50 is interposed around valve stem 52 between valve head 48 and bushing 54. A washer spacer 78 is slideably mounted on stem 52 and interposed between two groups of bimetallic discs in order to tightly align the stacked bimetallic discs.

In operation, as the temperature of the fluid rises, the expanding force of the bimetallic discs 50 opposes the force of the small coil springs 66 which normally biases valve head 48 away from seat 40. At a predetermined temperature, the spring resistance is overcome and the valve head 48 closes against seat 40. It will be understood that bimetals of different composition for different operating temperatures may be employed. Heat exchanger 80 is connected by conduit 30 to the outlet 26 of valve 10 and the output end of the heat exchanger is connected by conduit 32 to the inlet 22 of the valve 10.

Under normal operating conditions, lubricating fluid from a fluid system (not shown) enters the thermal bypass valve 10 through inlet aperature 28 at conduit 34 and flows into the rear part 44 of the valve chamber 20. When the fluid is relatively cool it flows through the valve conduit 34, through aperature 42, past the head 48 and bimetallic discs 50, and out through the aperature 24 into conduit 36. Since the back pressure or pressure drop through heat exchanger 80 is higher than through valve 10 only a small fraction of fluid will pass through the heat exchanger when the valve is in the open position. However, when the temperature of the lubricating fluid rises above a predetermined temperature, the discs expand and the valve head 48 closes aperature 42 forcing the fluid to flow through the heat exchanger 80. Conversely, when the temperature of the oil drops sufficiently, the valve again opens and acts to bypass the heat exchanger circuit.

Thus, when lubricating fluid reaches a predetermined temperature the bimetallic discs 50 expand between the valve head 48 and the bushing 54 thereby compressing spring 66 with the result that piston 56, valve stem 52, and valve head 48 are displaced to the right of their positions shown in FIG. 1 until valve head 48 comes into seating contact with seat 40, closing aperature 42 and shutting off fluid communication between rear chamber part 44 and front chamber part 46 through aperature 42.

With aperature 42 now closed, the hot lubricating fluid is forced to flow through the rear valve chamber part 44, out through aperature 26, and through conduit 30 into the heat exchanger 80. From there the fluid flows back through conduit 32, into aperature 22, into front valve chamber 46, past bimetallic discs 50, and out through aperature 24 into return conduit 36. When the temperature of the lubricating fluid has sufficiently decreased, heat sensitive bimetallic discs 50 which are in constant fluid contact contract thereby allowing coil spring 66 to expand with the result that piston 56, valve stem 52 and valve head 48 are displaced to the left as seen in FIG. 1 away from seat 40 to once again open direct communication between rear part 44 and front part 46 of valve chamber 20. Valve 10 is insensitive to changing fluid flow rates in either the open or closed position because the hydraulic force on the end of valve head 48 is substantially balanced by the approximately equal opposing force produced on end 57 of piston 56 which fluid force balance is achieved by fluid communication to end 57 through the hollow valve stem 52.

In addition to functioning as a thermally responsive bypass valve, it is customary for valves such a this to also function to bypass the heat exchanger when the fluid pressure in chamber part 44 exceeds a designed safe pressure at the time the bypass valve is closed and fluid is flowing through the heat exchanger. In prior valve designs the incorporation of this feature has precluded completely pressure balancing the valve in normal operation and has therefore resulted in the prior art valves being sensitive to varying fluid flow rates with resultant premature valve closing at low fluid rates and delayed valve closing at high flow rates.

Assuming again the closed position of valve head 48 relative to aperature 42, if a fluid pressure differential exists, such as occurs when a passage in the heat exchanger 80 becomes plugged, the pressure in chamber part 44 builds up sufficiently that the hydraulic force exerted on the exposed surface portion of ball 74 overcomes the force of spring 76 and the check valve opens thereby venting the fluid to chamber part 46 through a relief passage 82 formed in actuator support 16. This venting instantaneously reduces the pressure on piston end 57. With the effective fluid pressure reduced, a differential force is created between piston end 57 and the opposing end of valve head 48. This differential force overcomes the expansion force of the bimetallic discs 50 and urges the valve head 48 away from sealing engagement with seat 40 resulting in lubricating fluid being allowed to flow through the valve aperature 42 and out aperature 24 to conduit 36 thereby bypassing heat exchanger 80.

In summary, valve 10 normally functions to direct fluid above a predetermined temperature level through heat exchanger 80. However when the fluid also exceeds a predetermined safe pressure differential level, valve 10 functions to direct the temperature-pressure elevated fluid through valve chamber aperature 42 thereby bypassing heat exchanger 80. Too high a fluid pressure causes check valve assembly 70 to open to reduce the pressure applied to the piston end 57 exposed to the same level of fluid pressure as that in chamber part 44. This creates a force differential between piston 56 and valve head 48 which force combines with the force of spring 66 to overcome the expansion force of the bimetallic discs and unseat valve head 48. When the excessive pressure condition is relieved, the check valve 70 will reclose and the valve head 48 reseat in seat 40 if the discs are still exposed to a high enough fluid temperature to cause thermal expansion thereof.

It is to be understood that the above detailed description of the present invention is intended to disclose an embodiment thereof to those skilled in the art, but that the invention is not to be construed as limited in its application to the details of construction and arrangement of parts illustrated in the accompanying drawings, since the invention is capable of being practiced and carried out in various ways without departing from the spirit of the invention. The language used in the specification relating to the operation and function of the elements of the invention is employed for purposes of description and not of limitation, and it not intended to limit the scope of the following claims beyond the requirements of the prior art.

What is claimed is:

1. For use in a fluid circuit embodying fluid guide structure defining a pair of distinct fluid paths and a bypass passage interconnecting said paths and having a valve set therein, an improved thermally responsive valve subassembly comprising:

(a) a valve member;
(b) means mounting said valve member in one of said paths for movement toward and away from seating engagement with said valve seat;
(c) means resiliently biasing said valve member away from said valve seat;
(d) thermally responsive means disposed in said one path and connected to said valve member to overcome said biasing means and thereby move said valve member to engage said valve seat when the fluid temperature in said one path exceeds a predetermined magnitude;
(e) means responsive to pressure of the fluid at the face of said valve member for normally exerting a force on said valve member counterbalancing the effect of fluid pressure acting on the face of said valve member; and
(f) means for disabling said counterbalancing force exerting means when the fluid pressure at the face of said valve member exceeds a predetermined limit, wherein said counterbalancing force exerting means includes a piston chamber, a piston in said chamber, a normally closed spring biased check valve means mounted on said piston, means communicating the fluid pressure at said valve member face to said piston chamber, and a relief passage at the downstream side of said check valve means whereby the check valve means will open and relieve the pressure in said piston chamber when the pressure therein is excessive.

2. The combination is defined in claim 1 wherein said mounting means comprises a spring biased valve stem axially reciprocal toward and away from said valve seat, said stem mounting said piston for movement therewith.

3. The combination as defined in claim 1, further comprising thermally responsive means connected to said valve head which urges said valve head away from said piston chamber when the fluid temperature exceeds a predetermined value.

* * * * *